United States Patent
Jha et al.

(10) Patent No.: US 11,954,506 B2
(45) Date of Patent: Apr. 9, 2024

(54) INSPECTION MECHANISM FRAMEWORK FOR VISUALIZING APPLICATION METRICS

(71) Applicant: International Business Machines Corporation, Armonk, NY (US)

(72) Inventors: Ankit Jha, Dublin, OH (US); Sundari Voruganti, San Jose, CA (US); Lalit Somavarapha, Union City, CA (US); Vikram Sri Nitesh Tantravahi, San Jose, CA (US); Sriram Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/215,199

(22) Filed: Mar. 29, 2021

(65) Prior Publication Data
US 2022/0308901 A1 Sep. 29, 2022

(51) Int. Cl.
G06F 9/451 (2018.01)
G06F 11/34 (2006.01)

(52) U.S. Cl.
CPC .......... *G06F 9/451* (2018.02); *G06F 11/3409* (2013.01)

(58) Field of Classification Search
None
See application file for complete search history.

(56) References Cited

U.S. PATENT DOCUMENTS

| | | | |
|---|---|---|---|
| 6,412,106 B1 | 6/2002 | Leask | |
| 7,302,675 B2 | 11/2007 | Rogers | |
| 7,852,337 B2 | 12/2010 | Archer | |
| 8,219,975 B2 | 7/2012 | Goossen | |
| 8,443,287 B2 | 5/2013 | Gooding | |
| 8,639,989 B1* | 1/2014 | Sorenson, III | G06F 11/2071 709/224 |
| 8,874,722 B2 | 10/2014 | Gooding | |
| 10,503,553 B1* | 12/2019 | Ashok | G06F 11/3024 |
| 11,487,588 B2* | 11/2022 | Shivanna | G06F 9/5016 |
| 2011/0029981 A1* | 2/2011 | Jaisinghani | H04L 41/344 718/100 |
| 2011/0296250 A1* | 12/2011 | Calsyn | G06F 11/362 714/46 |
| 2011/0314453 A1 | 12/2011 | Tebeka | |
| 2012/0036498 A1* | 2/2012 | Akirekadu | G06F 11/3409 717/124 |
| 2012/0311537 A1 | 12/2012 | Derose | |
| 2013/0318541 A1* | 11/2013 | Balasaygun | G06F 9/4843 719/313 |

(Continued)

OTHER PUBLICATIONS

"A collection of Kubernetes widgets for Übersicht", GitHub, Printed Feb. 18, 2021, 2 pages, <https://github.com/guilhermeblanco/kubernetes-widget>.

(Continued)

*Primary Examiner* — Chat C Do
*Assistant Examiner* — William C Wood
(74) *Attorney, Agent, or Firm* — Randy Tejeda

(57) ABSTRACT

In an approach for visualizing metrics towards optimizing application performance, a processor identifies an application, running in a user interface, on a cloud platform. A processor calculates information metrics of the application. A processor presents the information metrics on the user interface with the application.

12 Claims, 7 Drawing Sheets

(56) References Cited

U.S. PATENT DOCUMENTS

| | | | | |
|---|---|---|---|---|
| 2013/0332919 | A1* | 12/2013 | Emejulu | G06F 8/61 |
| | | | | 717/174 |
| 2017/0093637 | A1* | 3/2017 | Baukes | H04L 41/0873 |
| 2017/0199770 | A1* | 7/2017 | Peteva | G06F 9/5088 |
| 2017/0212718 | A1* | 7/2017 | Nelson | G06F 40/143 |
| 2020/0042573 | A1* | 2/2020 | Presler-Marshall | |
| | | | | G06F 11/3409 |
| 2021/0286697 | A1* | 9/2021 | Yang | G06F 11/3452 |

OTHER PUBLICATIONS

"Cloud Monitoring Overview", LogicMonitor, Printed Feb. 18, 2021, 5 pages, <https://www.logicmonitor.com/support/lm-cloud/getting-started-lm-cloud/1-lm-cloud>.

"google/cadvisor: Analyzes resource usage and performance characteristics of running containers", GitHub, Printed Feb. 18, 2021, 4 pages, <https://github.com/google/cadvisor>.

"Kubernetes / kube-state-metrics: Add-on agent to generate and expose cluster-level metrics", GitHub, Printed Feb. 18, 2021, 11 pages, <https://github.com/kubernetes/kube-state-metrics>.

"Kubernetes Operational View—read-only system dashboard for multiple K8s clusters", GitHub, Printed Feb. 18, 2021, 2 pages, <https://github.com/hjacobs/kube-ops-view>.

"Widgets - kubernetes Project", transifex, Printed Feb. 18, 2021, 2 pages, <https://www.transifex.com/ke4qqq/kubernetes/widgets/>.

Chou, Helen, "IoT Platform Widget Library—Rapidly Build Application User Interface with Real-Time Data", IBM, Jun. 26, 2017, 8 pages, <https://www.ibm.com/cloud/blog/iot-platform-widget-library>.

Haas, Jameson, "Monitor Kubernetes in Production with Automated Dashboards", BlueMedora Blog, Apr. 7, 2020, 11 pages, <https://bluemedora.com/monitor-kubernetes-in-production-with-automated-dashboards/>.

Mell et al., "The NIST Definition of Cloud Computing", Recommendations of the National Institute of Standards and Technology, Special Publication 800-145, Sep. 2011, 7 pages.

* cited by examiner

INSPECTION MECHANISM FRAMEWORK FOR VISUALIZING APPLICATION METRICS

BACKGROUND

The present disclosure relates generally to the field of cloud application, and more particularly to inspection mechanism and root cause detection framework for visualizing metrics towards optimizing application performance.

A cloud application is an Internet-based program where some, or all, of the processing logic and data storage is processed in the cloud. A user may interact with the application via a web browser or a mobile application, and the data processing is managed by a combination of a local device and a cloud computing solution. From the user's perspective, the cloud application may behave like a standard website, but the computing and data processing are handled by the cloud via an application program interface (API).

SUMMARY

Aspects of an embodiment of the present disclosure disclose an approach for visualizing metrics towards optimizing application performance. A processor identifies an application, running in a user interface, on a cloud platform. A processor calculates information metrics of the application. A processor presents the information metrics on the user interface with the application.

DETAILED DESCRIPTION

The present disclosure is directed to systems and methods for an inspection mechanism and root-cause detection framework for visualizing metrics towards optimizing application performance on cloud.

Embodiments of the present disclosure recognize that cloud users have a need to be able to figure why an application is failing or why application performance is not consistent. The user may have to switch back and forth between a monitoring page/tool (if the user has an administration access), and a user interface of the application to know resource usages of the application. Embodiments of the present disclosure recognize a need for an overview of usage metrics of an application so that a user can observe and take a proactive action. Embodiments of the present disclosure recognize a need for tracking metrics (e.g., resource usages) details on a same application screen. Embodiments of the present disclosure disclose an inspector widget that will be presented alongside a user interface. The inspector widget may provide metrics and metadata of an application servicing the user interface. Embodiments of the present disclosure disclose providing a monitoring utility right to a user. The user may communicate the metrics information to an administrator for troubleshooting, if needed.

Embodiments of the present disclosure disclose identifying an application in a cloud platform servicing a user interface. Embodiments of the present disclosure disclose calculating and displaying metrics (e.g., computational resources usage status) of the application along with overall system metrics. Embodiments of the present disclosure disclose helping a user understand the reasons behind application issues and ensuring that there are enough computational resources allocated for optimizing the overall performance. Embodiments of the present disclosure disclose a direct mapping of a user interface to an application and thereby the related metrics being readily available to a user. Embodiments of the present disclosure disclose an inspector widget to provide additional capabilities like the ability to increase quotas/limits, diagnose and heal issues. Embodiments of the present disclosure disclose proactively identifying cloud application/system outages wherein the threshold is close to being breached for various usage metrics. Embodiments of the present disclosure disclose a notification system which may be integrated within an inspector widget and could be used to notify an administration support. The notification system may trigger diagnostics data collection to be sent over to the administration support for a quick resolution.

Figure 1:
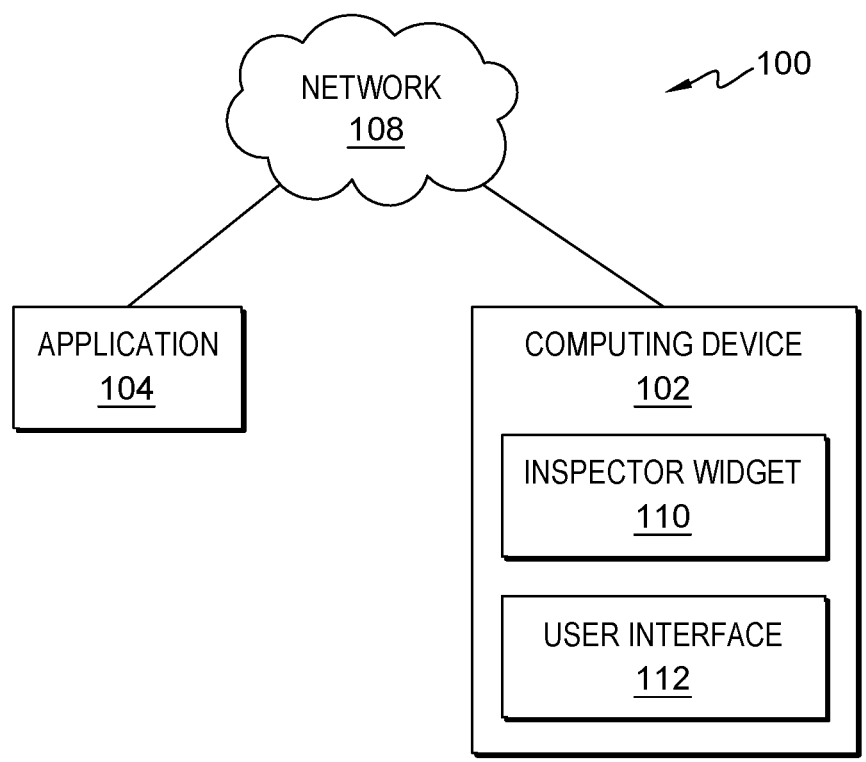
FIG. 1 is a functional block diagram illustrating a cloud application monitoring environment, in accordance with an embodiment of the present disclosure.

The present disclosure will now be described in detail with reference to the Figures. FIG. 1 is a functional block diagram illustrating a cloud application monitoring environment, generally designated 100, in accordance with an embodiment of the present disclosure.

In the depicted embodiment, cloud application monitoring environment 100 includes computing device 102, application 104, and network 108. In one or more embodiments, application 104 is a cloud application. A cloud application may simply refer to a software application that is deployed in a cloud environment rather than being hosted on a local server or machine. A user may access a cloud application primarily through the internet, meaning at least some of the cloud application is managed by a server and not users' local machines. A cloud application may be a software program where cloud-based and local components work together. In other embodiments, application 104 may be any application servicing user interface 112.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to inspector widget 110 and network 108 and is capable of processing program instructions and executing inspector widget 110, in accordance with an embodiment of the present disclosure. Computing device 102 may include internal and external hardware components, as depicted and described in further detail with respect to FIG. 5.

Further, in the depicted embodiment, computing device 102 includes inspector widget 110 and user interface 112. In the depicted embodiment, inspector widget 110 and user interface 112 are located on computing device 102. However, in other embodiments, inspector widget 110 and user interface 112 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and inspector widget 110 and user interface 112, in accordance with a desired embodiment of the disclosure.

In one or more embodiments, inspector widget 110 is configured to identify application 104, running in user interface 112, on a cloud platform. Application 104 from the cloud platform may serve user interface 112 and run in user interface 112. The cloud platform may be a cluster-based cloud system, e.g., Kubernetes®. Kubernetes® may be a portable, extensible, open-source platform for managing containerized workloads and services, that facilitates both declarative configuration and automation. In an example, the cloud platform may be a platform that hosts one or more data and artificial intelligent services (e.g., add-ons). Users may be working on the services through an instance portal. In an example, inspector widget 110 may receive a uniform resource locator (URL) from a user for application 104. Inspector widget 110 may proxy the URL through a controller (e.g., ingress controller "nginx") which may identify a service that is responsible for application 104. Inspector widget 110 may identify application 104 through service annotations in the service. Inspector widget 110 may detect pod details through the service annotations. Inspector widget 110 may proactively identify an application outage when a threshold is close to be breached for various usage metrics.

In one or more embodiments, inspector widget 110 is configured to calculate information metrics (e.g., service metrics) of application 104. For example, information metrics may include central processing unit (CPU) information, memory usage, disk (storage) usage and network usage of application 104. Inspector widget 110 may obtain and gather the information metrics of application 104. Inspector widget 110 may obtain and gather system metrics. Inspector widget 110 may calculate the information metrics of identified application 104 by using a metric detection function. Inspector widget 110 may gather the system metrics using the metric detection function. The system metrics may include an overall namespace and node level usage metrics. Inspector widget 110 may gather diagnostics information for application 104. Inspector widget 110 may notify an administration support with an alert based on the diagnostics information. Inspector widget 110 may trigger diagnostics data collection to be sent over to an administration support for a quicker resolution.

In one or more embodiments, inspector widget 110 is configured to present the information metrics (e.g., service metrics) of application 104 on user interface 112 with application 104. Inspector widget 110 may present other information collected (e.g., system metrics) on user interface 112 with application 104. Inspector widget 110 may send an alert to the administration support based on diagnostics available so the administration support may take a corrective course of action. Inspector widget 110 may be shown alongside user interface 112 and may provide the metadata of the application servicing user interface 112/backend including the metrics information. Inspector widget 110 may provide monitoring utility right to a user who can communicate the metrics information to the administration support for troubleshooting, if needed. Inspector widget 110 may display information metrics of application 104 along with overall system metrics. Presented information metrics and overall system metrics may help a user understand reasons behind application issues and ensure that there are enough computational resources allocated for optimizing the overall performance. Inspector widget 110 may provide a direct mapping of user interface 112 to application 104 and the related metrics being readily available to a user. Inspector widget 110 may provide the metrics details on user interface 112. Inspector widget 110 may describe the details of application 104 that is servicing user interface 112 (e.g., DB2®) and may also provide the application metrics. Inspector widget 110 may showcase overall system metrics for the cluster and information about failing pods, if permissions are enabled, and may also provide a way to redirect to the monitoring/serviceability page if the user has an associated permission. Inspector widget 110 may provide additional capabilities like the ability to increase quotas/limits, diagnose and heal issues, etc. Inspector widget 110 may notify the system administration in advance so that the administration can then take proactive steps to avoid the application crashing or falling below acceptable performance levels. Inspector widget 110 may collect diagnostics information which may be sent to the admins/support team which reduces time overhead typically involved in such situations.

Figure 2:
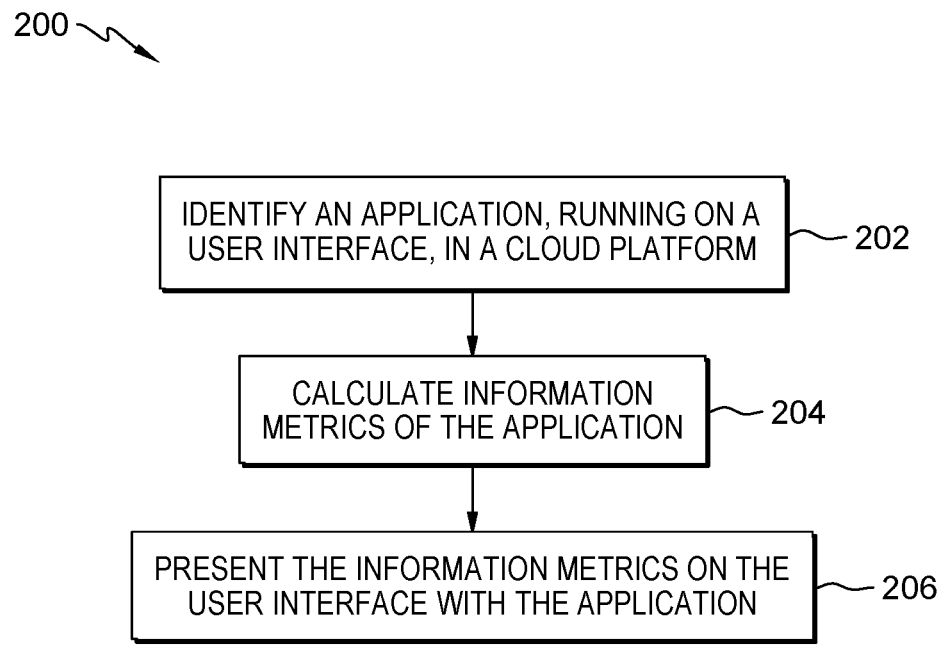
FIG. 2 is a flowchart depicting operational steps of an inspector widget within a computing device of FIG. 1, in accordance with an embodiment of the present disclosure.

FIG. 2 is a flowchart 200 depicting operational steps of inspector widget 110 in accordance with an embodiment of the present disclosure.

Inspector widget 110 operates to identify application 104, running in user interface 112, on a cloud platform. Inspector widget 110 also operates to calculate information metrics of application 104. Inspector widget 110 operates to present the information metrics of application 104 on user interface 112 with application 104.

In step 202, inspector widget 110 identifies application 104, running in user interface 112, on a cloud platform. Application 104 from the cloud platform may serve user interface 112 and run in user interface 112. The cloud platform may be a cluster-based cloud system, e.g., Kubernetes®. Kubernetes® may be a portable, extensible, open-source platform for managing containerized workloads and services, that facilitates both declarative configuration and automation. In an example, the cloud platform may be a platform that hosts one or more data and artificial intelligent services (e.g., add-ons). Users may be working on the services through an instance portal. In an example, inspector widget 110 may receive a URL from a user for application 104. Inspector widget 110 may proxy the URL through a controller (e.g., ingress controller "nginx") which may identify a service that is responsible for application 104. Inspector widget 110 may identify application 104 through service annotations in the service. Inspector widget 110 may detect pod details through the service annotations. Inspector widget 110 may proactively identify an application outage when a threshold is close to be breached for various usage metrics.

In step 204, inspector widget 110 calculates information metrics of application 104. For example, information metrics may include CPU information, memory usage, disk (storage) usage and network usage of application 104. Inspector widget 110 may obtain and gather the information metrics of application 104. Inspector widget 110 may obtain and gather system metrics. Inspector widget 110 may calculate the information metrics of identified application 104 by using a metric detection function. Inspector widget 110 may gather the system metrics using the metric detection function. The system metrics may include an overall namespace and node level usage metrics. Inspector widget 110 may gather diagnostics information for application 104. Inspector widget 110 may notify an administration support with an alert based on the diagnostics information. Inspector widget 110 may trigger diagnostics data collection to be sent over to an administration support for a quicker resolution.

In step 206, inspector widget 110 presents the information metrics of application 104 in user interface 112 with application 104. Inspector widget 110 may present other information collected (e.g., system metrics) in user interface 112 with application 104. Inspector widget 110 may send an alert to the administration support based on diagnostics available so the administration support may take a corrective course of action. Inspector widget 110 may be shown alongside user interface 112 and may provide the metadata of the application servicing user interface 112/backend including the metrics information. Inspector widget 110 may provide monitoring utility right to a user who can communicate the metrics information to the administration support for troubleshooting, if needed. Inspector widget 110 may display information metrics of application 104 along with overall system metrics. Presented information metrics and overall system metrics may help a user understand reasons behind application issues and ensure that there are enough computational resources allocated for optimizing the overall performance. Inspector widget 110 may provide a direct mapping of user interface 112 to application 104 and the related metrics being readily available to a user. Inspector widget 110 may provide the metrics details in user interface 112. Inspector widget 110 may describe the details of application 104 that is servicing user interface 112 (e.g., DB2®) and may also provide the application metrics. Inspector widget 110 may showcase overall system metrics for the cluster and information about failing pods, if permissions are enabled, and may also provide a way to redirect to the monitoring/serviceability page if the user has an associated permission. Inspector widget 110 may provide additional capabilities like the ability to increase quotas/limits, diagnose and heal issues, etc. Inspector widget 110 may notify the system administration in advance so that the administration can then take proactive steps to avoid the application crashing or falling below acceptable performance levels. Inspector widget 110 may collect diagnostics information which may be sent to the admins/support team which reduces time overhead typically involved in such situations.

Figure 3:
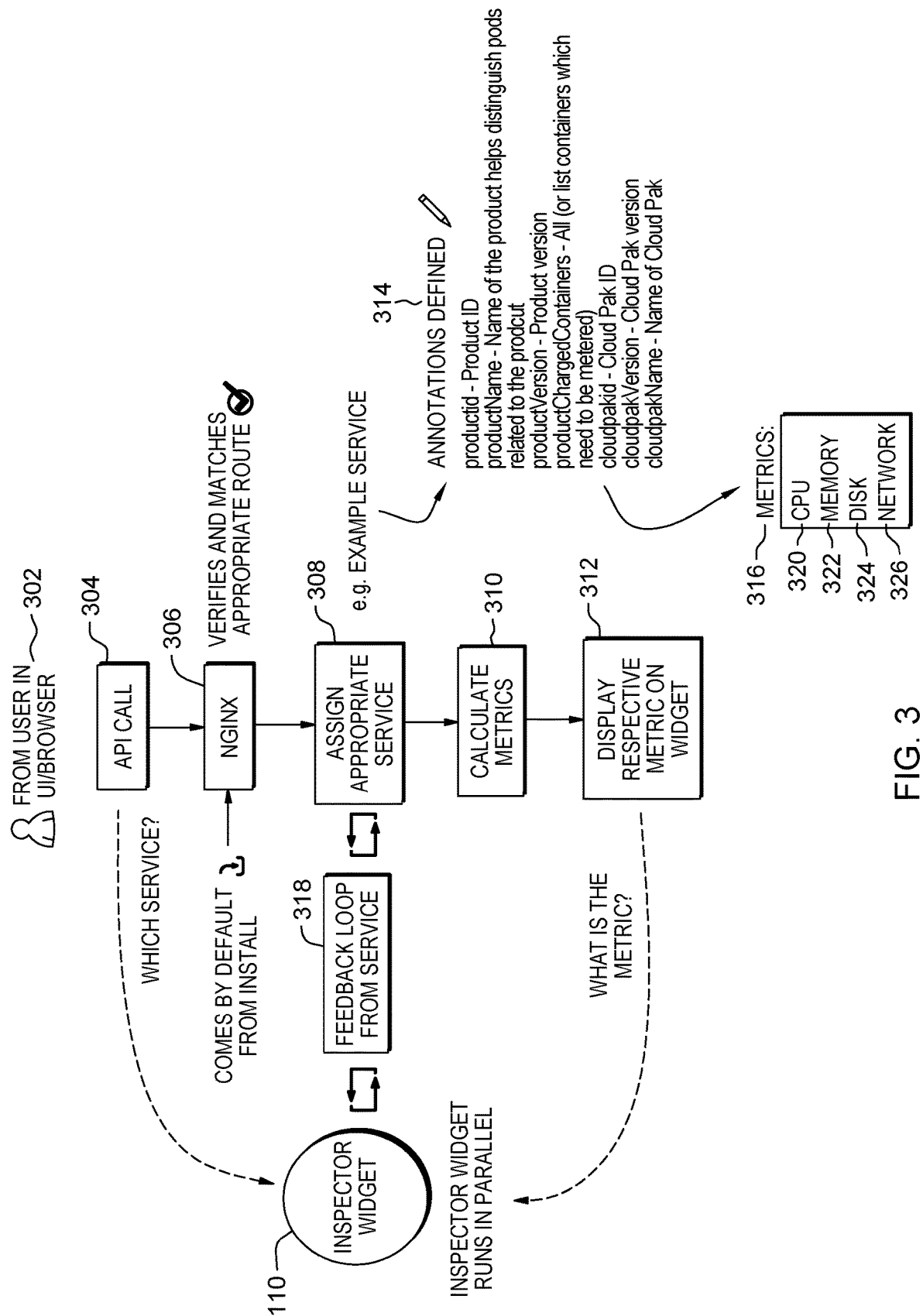
FIG. 3 illustrates an exemplary functional diagram of the inspector widget within the computing device of FIG. 1, in accordance with an embodiment of the present disclosure.

FIG. 3 illustrates an exemplary functional diagram of inspector widget 110 in accordance with one or more embodiments of the present disclosure.

In the example of FIG. 3, inspector widget 110 may identify application 104 through application programming interface (API) call 304. In an example, inspector widget 110 may receive a URL from user 302 for application 104. Inspector widget 110 may proxy the URL through a controller (e.g., ingress controller nginx 306) which may verify and match a service that is responsible for application 104. Inspector widget 110 may assign appropriate service 308 for application 104 through service annotations 314 in the service. Inspector widget 110 may detect pod details through service annotations 314. Inspector widget 110 may provide feedback loop from service 318. Inspector widget 110 may proactively identify an application outage when a threshold is close to be breached for various usage metrics. Inspector widget 110 may calculate information metrics of application 104 in step 310. For example, information metrics 316 may include CPU 320, memory usage 322, disk (storage) usage 324 and network usage 326 of application 104. Inspector widget 110 may obtain and gather the information metrics 316 of application 104. Inspector widget 110 may calculate the information metrics of identified application 104 by using a metric detection function. Inspector widget 110 may present the information metrics of application 104 on user interface 112 with application 104 in step 312. Inspector widget 110 may present other information collected (e.g., system metrics) on user interface 112 with application 104. Inspector widget 110 may send an alert to the administration support based on diagnostics available so the administration support may take a corrective course of action. Inspector widget 110 may be shown alongside user interface 112 and may provide the metadata of the application servicing user interface 112 including the metrics information. Inspector widget 110 may display information metrics of application 104 along with overall system metrics. Presented information metrics and overall system metrics may help a user understand reasons behind application issues and ensure that there are enough computational resources allocated for optimizing the overall performance.

Figure 4:
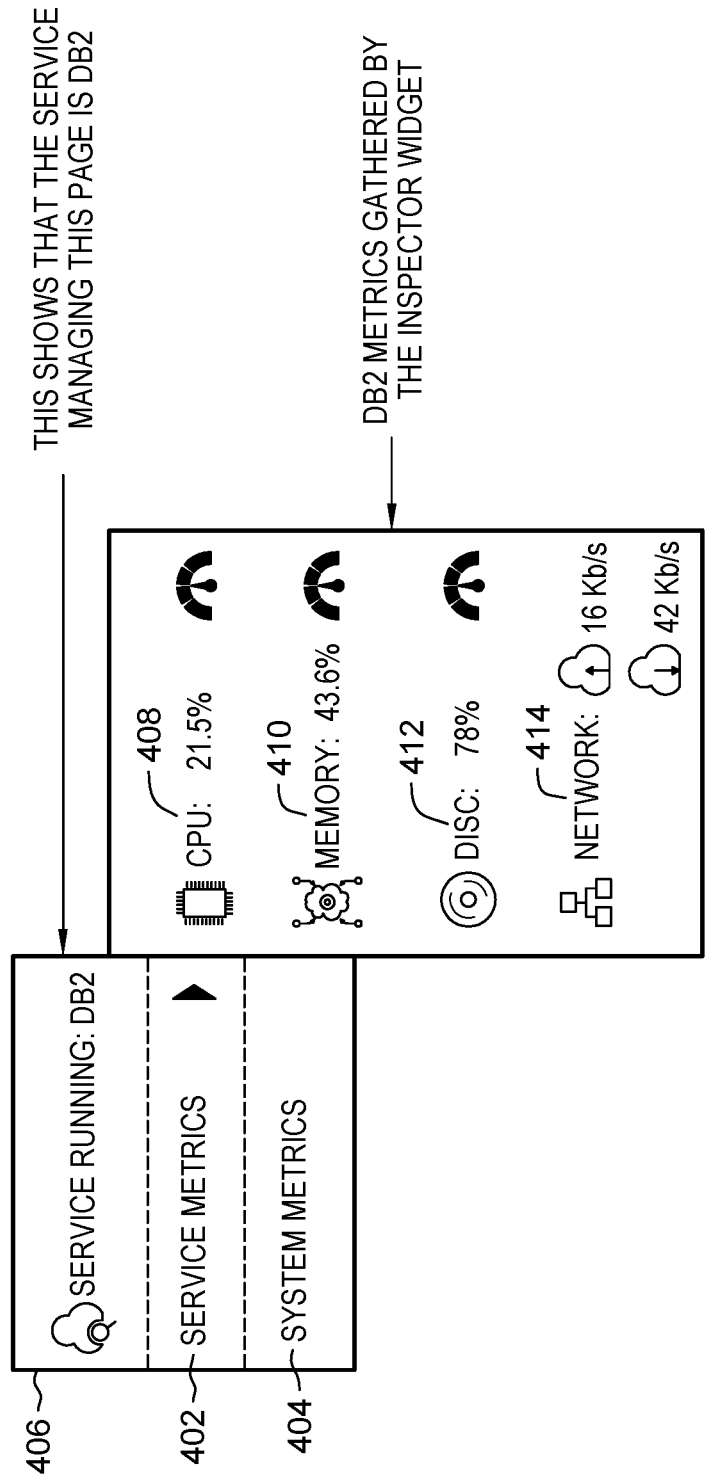
FIG. 4 illustrates an exemplary user interface to display the inspector widget within the computing device of FIG. 1, in accordance with an embodiment of the present disclosure.

FIG. 4 illustrates an exemplary user interface 112 to display inspector widget 110 in accordance with one or more embodiments of the present disclosure.

In the example of FIG. 4, inspector widget 110 presents metrics (e.g., service metrics 402 system metrics 404) of application 104 (e.g., DB2® 406) on user interface 112 with application 104. Inspector widget 110 may be shown alongside user interface 112 and may provide the metadata of the application servicing user interface 112 including the metrics information, e.g., CPU 408, memory 410, disc (storage) 412, and network 414. Inspector widget 110 may provide monitoring utility right to a user who can communicate the metrics information to the administration support for troubleshooting, if needed. Inspector widget 110 may display information (service) metrics 402 of application 104 along with overall system metrics 404. Presented information (service) metrics 402 and overall system metrics 404 may help a user understand reasons behind application issues and ensure that there are enough computational resources allocated for optimizing the overall performance.

Figure 5:
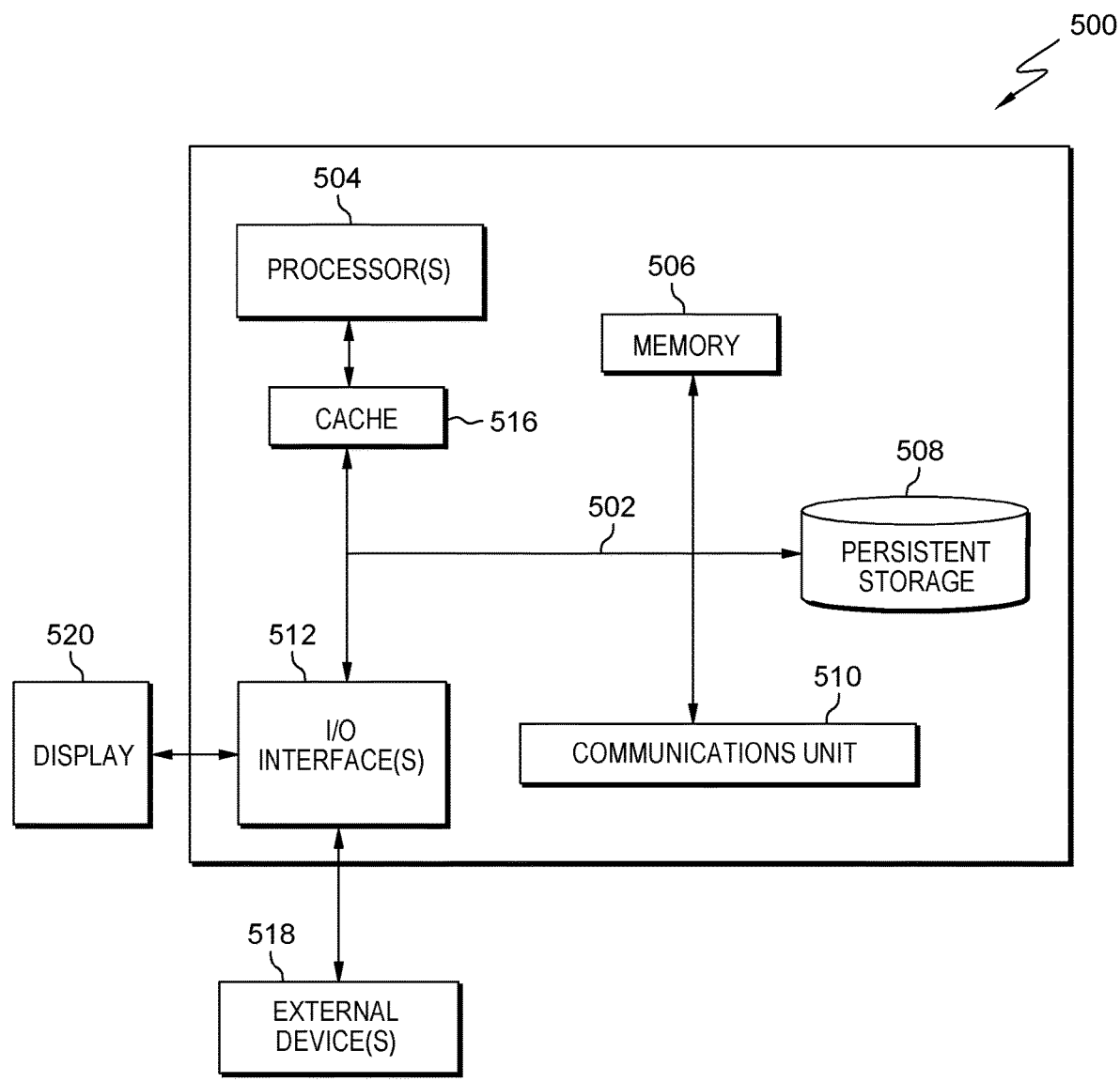
FIG. 5 is a block diagram of components of the computing device of FIG. 1, in accordance with an embodiment of the present disclosure.

FIG. 5 depicts a block diagram 500 of components of computing device 102 in accordance with an illustrative embodiment of the present disclosure. It should be appreciated that FIG. 5 provides only an illustration of one implementation and does not imply any limitations with regard to the environments in which different embodiments may be implemented. Many modifications to the depicted environment may be made.

Computing device 102 may include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Inspector widget 110 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Inspector widget 110 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., inspector widget 110 can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
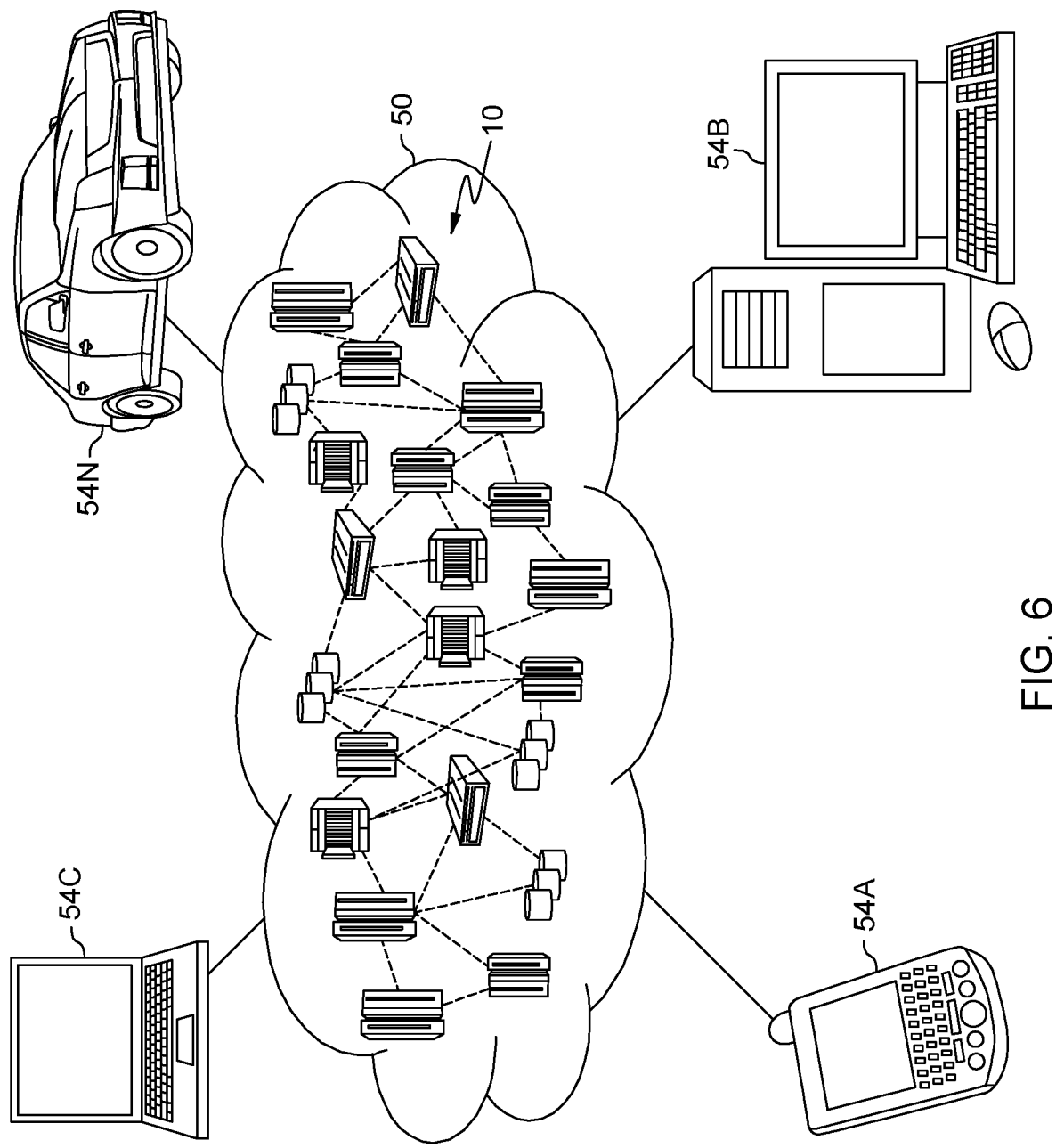
FIG. 6 depicts an embodiment of a cloud computing environment in accordance with the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
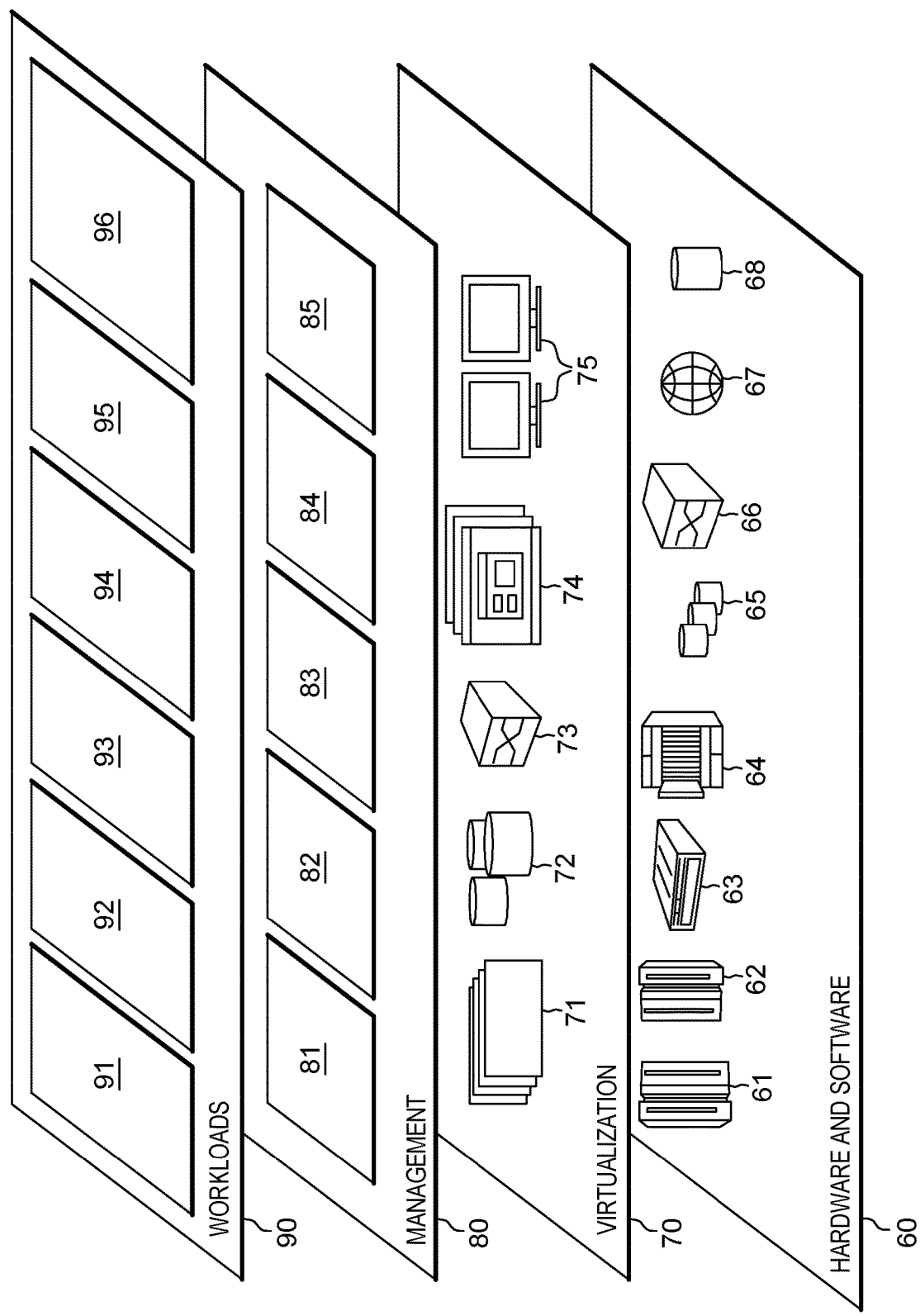
FIG. 7 depicts an embodiment of abstraction model layers of a cloud computing environment, in accordance with the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, inspector widget 110 as described above with respect to cloud application monitoring environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
    identifying, by one or more processors, an application, running in a user interface, on a cloud platform through one or more associated application programming interface calls;
    identifying, by one or more computer processors, a pod associated with the identified application through associated service annotations;
    receiving, by one or more processors, a uniform resource locator (URL) from a user for the application;
    proxying, by one or more processors, the URL through a controller which verifies and matches a service that is responsible for the application;
    assigning, by one or more processors, the service for the application through one or more annotations of the service;
    providing, by one or more processors, a feedback loop from the service;

proactively identifying, by one or more processors, a pod outage when a pre-defined threshold is close to being breached for usage metrics associated with the application;

calculating, by one or more processors, information metrics including the usage metrics of the application, wherein the information metrics include CPU information, memory usage, disk usage and network usage of the application;

responsive to identifying the pod outage, presenting, by one or more processors, the information metrics alongside of the user interface directly mapped to the application;

responsive to the user having an associated permission, redirecting, by one or more processors, the user to a serviceability page; and displaying, by one or more processors, the information metrics of the application along with overall system metrics.

2. The computer-implemented method of claim 1, further comprising: detecting, by one or more processors, the information metrics; and gathering, by one or more processors, the information metrics including overall namespace and node level usage metrics.

3. The computer-implemented method of claim 1, further comprising:

collecting, by one or more processors, diagnostics information for the application; and sending, by one or more processors, an alert to an administrator based on the diagnostics
information.

4. The computer-implemented method of claim 1, wherein an inspector widget is presented alongside the user interface with the application.

5. A computer program product comprising:
a computer readable storage medium, and program instructions collectively stored on the one or more computer readable medium storage, the program instructions comprising:
program instructions to identify an application, running in a user interface, on a cloud platform through one or more associated application programming interface calls;
program instructions to identify a pod associated with the identified application through associated service annotations;
program instructions to receive a URL from a user for the application;
program instructions to proxy the URL through a controller which verifies and matches a service that is responsible for the application;
program instructions to assign the service for the application through one or more annotations of the service;
program instructions to provide a feedback loop from the service;
program instructions to proactively identify a pod outage when a pre-defined threshold is close to being breached for usage metrics associated with the application;
program instructions to calculate information metrics including the usage metrics of the pod and the application, wherein the information metrics include CPU information, memory usage, disk usage and network usage of the application;
program instructions to, responsive to identifying the pod outage, present the information metrics alongside of the user interface directly mapped to the application;

program instructions to, responsive to the user having an associated permission, redirect the user to a serviceability page; and
program instructions to display the information metrics of the application along with overall system metrics.

6. The computer program product of claim 5, further comprising:
program instructions, stored on the one or more computer-readable storage medium, to detect the information metrics; and
program instructions, stored on the one or more computer-readable storage medium, to gather the information metrics including overall namespace and node level usage metrics.

7. The computer program product of claim 5, further comprising:
program instructions, stored on the one or more computer-readable storage medium, to collect diagnostics information for the application; and
program instructions, stored on the one or more computer-readable storage medium, to send an alert to an administrator based on the diagnostics information.

8. The computer program product of claim 5, wherein an inspector widget is presented alongside the user interface with the application.

9. A computer system comprising:
one or more computer processors, a computer readable storage medium, and program instructions stored on the computer readable storage medium for execution by at least one of the one or more computer processors, the program instructions comprising:
program instructions to identify an application, running in a user interface, on a cloud platform through one or more associated application programming interface calls;
program instructions to identify a pod associated with the identified application through associated service annotations;
program instructions to receive a URL from a user for the application;
program instructions to proxy the URL through a controller which verifies and matches a service that is responsible for the application;
program instructions to assign the service for the application through one or more annotations of the service;
program instructions to provide a feedback loop from the service;
program instructions to proactively identify a pod outage when a pre-defined threshold is close to being breached for usage metrics associated with the application;
program instructions to calculate information metrics including the usage metrics of the pod and the application, wherein the information metrics include CPU information, memory usage, disk usage and network usage of the application;
program instructions to, responsive to identifying the pod outage, present the information metrics alongside of the user interface directly mapped to the application;
program instructions to, responsive to the user having an associated permission, redirect the user to a serviceability page; and
program instructions to display the information metrics of the application along with overall system metrics.

10. The computer system of claim 9, further comprising:
program instructions, stored on the one or more computer-readable storage media, to detect the information metrics; and program instructions, stored on the one or more computer-readable storage media, to gather the information metrics including overall namespace and node level usage metrics.

11. The computer system of claim 9, further comprising:

program instructions, stored on the one or more computer-readable storage media, to collect diagnostics information for the application; and program instructions, stored on the one or more computer-readable storage media, to send an alert to an administrator based on the diagnostics information.

12. The computer system of claim 9, wherein an inspector widget is presented alongside the user interface with the application.

\* \* \* \* \*